United States Patent
Takemura et al.

(10) Patent No.: US 8,215,493 B2
(45) Date of Patent: Jul. 10, 2012

(54) MEMBRANE TREATMENT APPARATUS

(75) Inventors: Noboru Takemura, Tokyo (JP); Masahiro Saito, Tokyo (JP); Gaku Taniguchi, Tokyo (JP); Taishi Sato, Tokyo (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 403 days.

(21) Appl. No.: 12/525,474

(22) PCT Filed: Feb. 2, 2007

(86) PCT No.: PCT/JP2007/051798
§ 371 (c)(1),
(2), (4) Date: Jul. 31, 2009

(87) PCT Pub. No.: WO2008/096397
PCT Pub. Date: Aug. 14, 2008

(65) Prior Publication Data
US 2010/0096318 A1    Apr. 22, 2010

(51) Int. Cl.
*B01D 29/00* (2006.01)
*B01D 29/05* (2006.01)
*B01D 29/07* (2006.01)
*B01D 29/11* (2006.01)
*B01D 35/00* (2006.01)

(52) U.S. Cl. ........ 210/483; 210/348; 210/391; 210/435; 210/445; 210/451; 210/454; 210/488; 210/493.1; 210/503

(58) Field of Classification Search ............... 210/348, 210/391, 435, 445, 451, 461, 483, 488, 497.1, 210/503
See application file for complete search history.

(56) References Cited

U.S. PATENT DOCUMENTS

| | | | | |
|---|---|---|---|---|
| 3,698,562 A * | 10/1972 | Farrow et al. | | 210/488 |
| 3,767,054 A * | 10/1973 | Farrow et al. | | 210/232 |
| RE29,447 E * | 10/1977 | Farrow et al. | | 210/232 |
| 4,678,578 A * | 7/1987 | Nodes et al. | | 210/445 |
| 5,151,180 A * | 9/1992 | Giordano et al. | | 210/264 |
| 7,081,201 B2 * | 7/2006 | Bassett et al. | | 210/315 |

FOREIGN PATENT DOCUMENTS

| JP | 4-171030 A | * | 6/1992 |
| JP | 10-340 A | * | 1/1998 |
| JP | 5184819 | | 7/2009 |

OTHER PUBLICATIONS

English translation of the International Preliminary Report of PCT/JP2007/051798 (Aug. 4, 2009).*

* cited by examiner

*Primary Examiner* — John Kim
(74) *Attorney, Agent, or Firm* — K. David Crockett, Esq.; Niky Economy Syrengelas, Esq; Crockett & Crockett, PC

(57) ABSTRACT

A membrane treatment apparatus includes a filtration membrane 10 filtering raw water existing in an external environment 100 by applying pressure thereto and a treated water outlet 11 from which treated water collected after filtration by the filtration membrane 10 is taken, and is provided with a filter cloth 12 placed and fixed outside the filtration membrane 10 with a predetermined space left between the filter cloth and the filtration membrane. Preferably, the filter cloth 12 is provided in such a way as to cover an outer circumferential side and a bottom of the filtration membrane 10, and the filter cloth 12 is provided in such a way as to cover the outer circumferential side of the filtration membrane 10 with the bottom thereof uncovered.

4 Claims, 5 Drawing Sheets

MEMBRANE TREATMENT APPARATUS

TECHNICAL FIELD

The present invention relates to membrane treatment apparatuses, and more particularly to a membrane treatment apparatus that can prevent invasion of a suspended substance or an organic substance which causes a blockage into a membrane surface, can reduce the number of backwashes, and can wash a filter cloth itself when washing a membrane.

BACKGROUND ART

Conventionally, in the field of treatment of waste water such as sewage or night soil, the membrane treatment technology such as a microfiltration membrane or an ultrafiltration membrane has been further improved from solid-liquid separation means for obtaining clear treated water, and has come to be used as an alternate means of gravity-type solid-liquid separation means such as a sedimentation tank or a concentration tank.

In such filtration membrane treatment, since thick sludge such as activated sludge is separated into a solid and a liquid, clogging of the filtration membrane becomes a problem.

Patent Document 1 discloses a method of removing foreign substances in raw water with a filter cloth by providing the filter cloth on the surface of a filtration membrane, forming a cake layer formed of the foreign substances on the filter cloth, and treating the raw water which has passed through the cake layer with the next membrane.

According to the technology of Patent Document 1, it is true that even fine particles are removed by the pretreatment with the cake layer formed on the filter cloth, whereby the time that elapses before the filtration membrane is clogged is prolonged.

Patent Document 1: JP-A-5-184819

DISCLOSURE OF INVENTION

Problem to be Solved by the Invention

However, when the cake layer is formed on the filter cloth as in Patent Document 1, clogging easily occurs in the cake layer because the cake layer is adhered to the filter cloth in a consolidated state, and it is impossible to wash the filter cloth. After all, it is necessary to adopt a structure which allows the filter cloth to be always moved as shown in FIG. 2 of Patent Document 1 and, when clogging of the filter cloth occurs, form the cake layer again by moving the filter cloth and perform filtration, which makes it unable to function as a practical apparatus at all.

To overcome the drawback of such a technology, an objective of the present invention is to provide a membrane treatment apparatus that can wash a filter cloth itself at the time of backwash of a membrane.

Moreover, other objectives of the present invention will become apparent from the following description.

Means for Solving Problem

The above problem is solved by the following invention.

The invention is directed to a membrane treatment apparatus including: a filtration membrane filtering raw water existing in an external environment by applying pressure thereto; and a treated water outlet from which treated water collected after filtration by the filtration membrane is taken, wherein the membrane treatment apparatus is provided with a filter cloth provided outside the filtration membrane with a predetermined space left between the filter cloth and the filtration membrane.

The invention is directed to the membrane treatment apparatus wherein the filter cloth is provided in such a way as to cover an outer circumferential side and a bottom of the filtration membrane.

The invention is directed to the membrane treatment apparatus wherein the filter cloth is provided in such a way as to cover an outer circumferential side of the filtration membrane with a bottom of the filtration membrane uncovered.

The invention is directed to the membrane treatment apparatus wherein a lower part of the filter cloth is made to project downward so that the lower part is located below a lower end of the filtration membrane, and an outer circumference of the projecting portion is narrowed with an elastic cord body.

The invention is directed to the membrane treatment apparatus wherein the filter cloth has a pore diameter distribution in the range of 0.1 to 50 μm, and has a peak of the pore diameter distribution in the range of 5 to 25 μm.

The invention is directed to the membrane treatment apparatus wherein the filtration membrane is a microfiltration membrane, and a nominal pore diameter thereof is in the range of 0.1 to 1.0 μm.

The invention is directed to the membrane treatment apparatus wherein the filter cloth is pleated.

Effect of the Invention

The present invention can provide a practical membrane treatment apparatus that can prevent invasion of a suspended substance or an organic substance which causes a blockage into a membrane surface, can reduce the number of backwashes, and can wash a filter cloth itself when washing a membrane, and is particularly effective in treating ballast water.

EXPLANATIONS OF LETTERS OR NUMERALS

Figure 1:
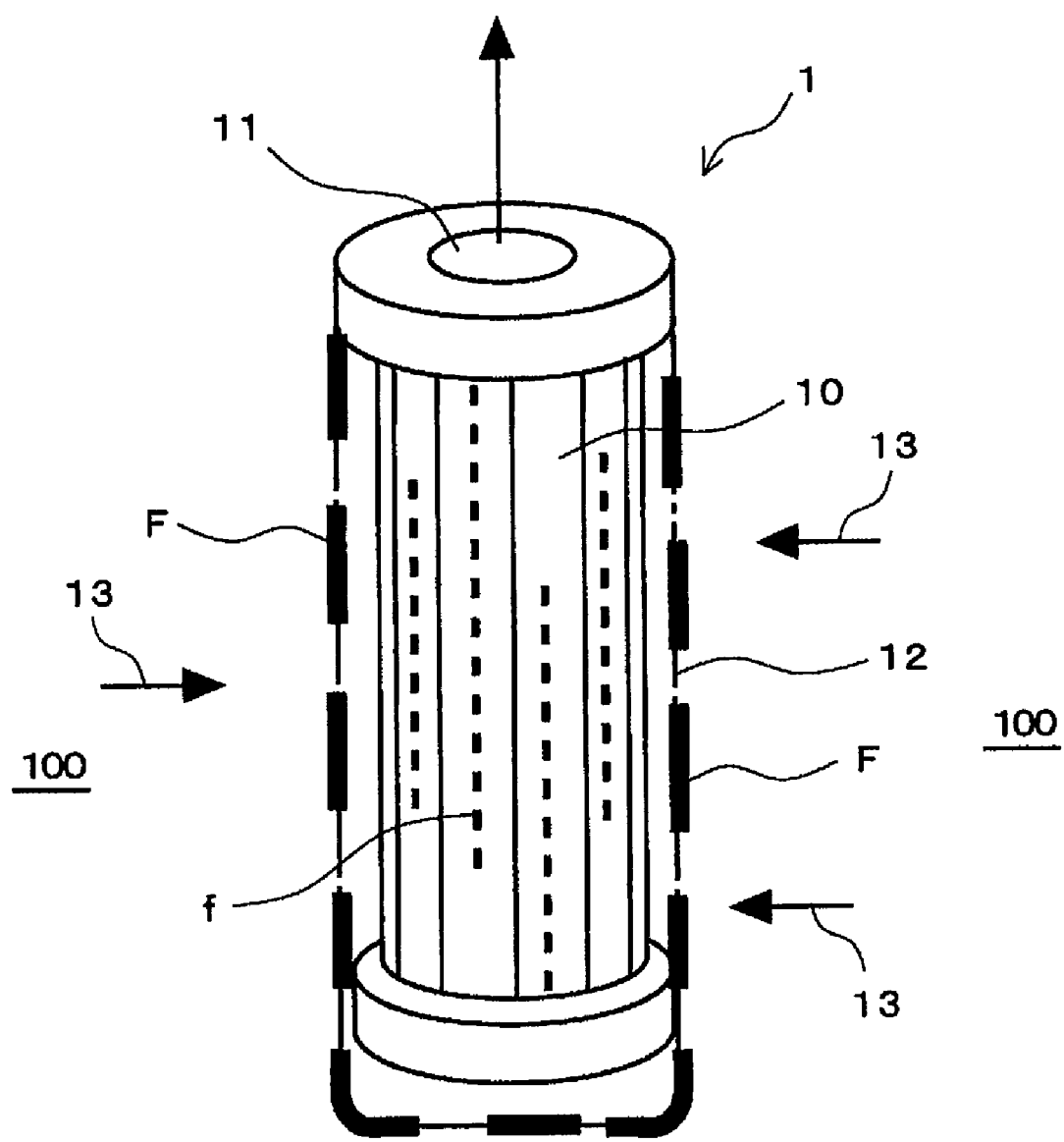
FIG. 1 is a diagram showing an example of a membrane treatment apparatus of the present invention.

1: membrane treatment apparatus
10: filtration membrane
11: treated water outlet
12: filter cloth
13: raw water
15: elastic cord body
100: external environment
F: large fouling
f: small fouling Best Mode for Carrying out the Invention Hereinafter, an embodiment of the present invention will be explained by using the drawings.

First Embodiment

FIG. 1 is a diagram showing an example of a membrane treatment apparatus of the present invention. In this drawing, 1 denotes a membrane treatment apparatus, 10 denotes a filtration membrane which filters raw water existing in an external environment 100 by applying pressure thereto, 11 denotes a treated water outlet from which the treated water collected after filtration is taken, and 12 denotes a filter cloth provided outside the filtration membrane 10.

This embodiment deals with an example in which the filter cloth 12 is provided in such a way as to cover the outer circumferential side and the bottom of the filtration membrane 10, the example adopting a so-called stocking-type filter cloth.

Incidentally, the membrane treatment apparatus 1 is preferably of the vertical type as shown in the drawing; however, it may be of the horizontal type.

Examples of the filtration membrane 10 include a microfiltration membrane (MF membrane), an ultrafiltration membrane (UF membrane), etc. The microfiltration membrane has an opening of sieve lying between ordinary filtration and ultrafiltration, and a nominal pore diameter is preferably in the range of 0.05 to 10 μm, and more preferably in the range of 0.1 to 1.0 μm. Moreover, although an opening of the ultrafiltration membrane is basically determined by a molecular weight cutoff, the ultrafiltration membrane is generally a membrane having the property of passing no fine particles of 0.005 to 0.1 μm and passing water, ion molecules, and low-molecule-weight substances.

In the present invention, the microfiltration membrane is preferable from the viewpoint of effectively removing bacteria etc. in ballast water.

As the material of the membrane, various types of synthetic resins (for example, polyester, acrylic, nylon, polyethylene, polypropylene, cellulose, and acetate) can be used; however, the material is not particularly limited thereto.

Figure 3:
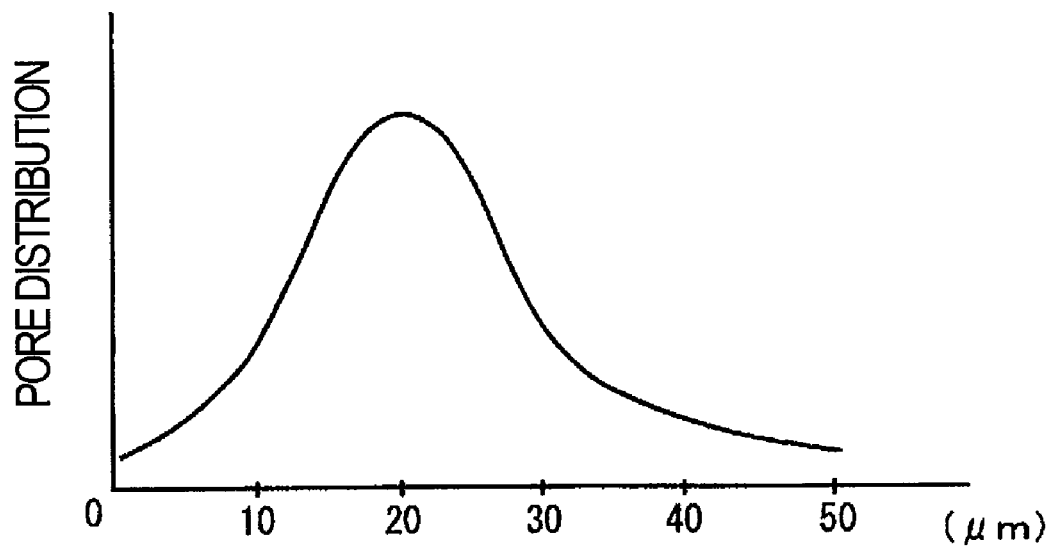
FIG. 3 is a diagram showing the relationship between the distribution of pores in a filter cloth and a pore diameter.

The filter cloth 12 may be a woven cloth or a nonwoven cloth. Preferably, as shown in FIG. 3, the filter cloth 12 is a cloth with a pore diameter distribution in the range of 0.1 to 50 μm and with a peak of the pore diameter distribution in the range of 5 to 25 μm.

Although the material of the filter cloth 12 is not particularly limited, it preferably has enough tensile strength to prevent the filter cloth 12 from being torn at the time of backwash, and has stretching properties in order to improve the effectiveness of backwash.

Figure 4:
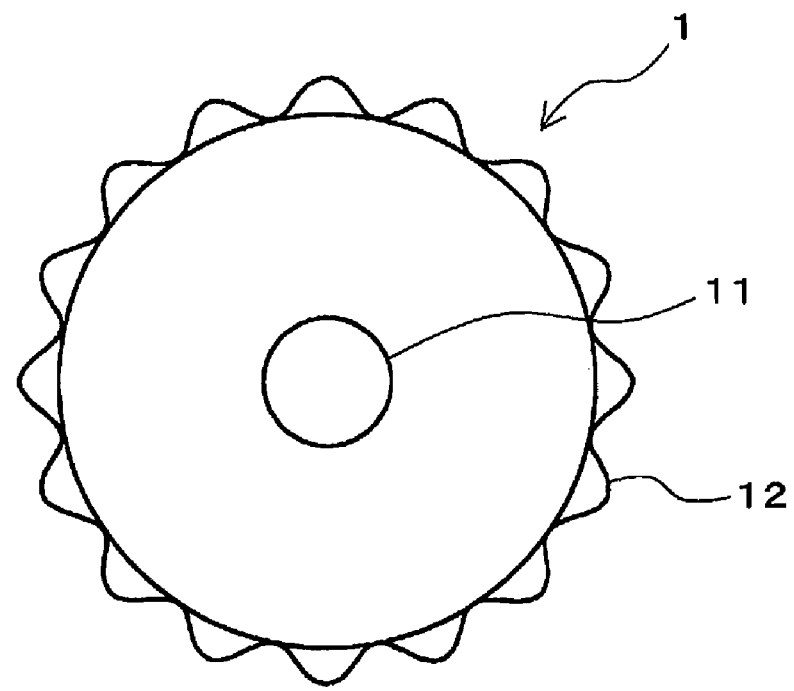
FIG. 4 is a diagram showing another embodiment of the filter cloth.

The installed filter cloth 12 may have a cylindrical shape as shown in FIG. 1. However, the filter cloth 12 pleated as shown in FIG. 4 is preferable because it also makes it possible to increase the filtration area twice or more and thereby improve the rate of capture of a suspended substance, an organic substance, and bacteria in the raw water. Moreover, this helps ensure stretching properties, eliminating the need to use a stretch material as a material of the filter cloth 12.

The raw water containing one or two or more of a suspended substance, an organic substance, bacteria, etc. is pressurized inward from the outside of the membrane treatment apparatus 1 as indicated by an arrow 13. Although a pressurizing mechanism is not shown in the drawing, it is not particularly limited as long as the raw water 13 outside the apparatus is pressurized.

In the course of pressurization, among the suspended substance, the organic substance, and the bacteria, those with a large particle diameter are captured by the filter cloth 12. The substances thus captured are hereinafter referred to as "fouling"; in the drawing, a letter F denotes "large fouling", and a letter f denotes "small fouling".

From the raw water which has passed through the filter cloth 12, a fine suspended substance, organic substance, and bacteria are captured by the filtration membrane 10 when the raw water is passing through the filtration membrane 10.

The membrane treatment apparatus 1 of the present invention is effective in removing bacteria in ballast water. A cargo ship transporting crude oil etc. generally has a ballast tank for maintaining the stability of the ship's hull in passage. In general, when the ship is loaded with no crude oil etc., the ballast tank is filled with ballast water, and the ballast water is discharged when the ship is loaded with crude oil etc. In this way, the buoyancy of the ship's hull is regulated, whereby the ship's hull is stabilized. As described above, the ballast water is water required for safe navigation of the ship, and seawater of the harbor where cargo is handled is generally used. The amount of ballast water worldwide is said to exceed 10 billion tons per year. Now, the ballast water contains microorganisms or eggs of small and large organisms living in the harbor from which the ballast water is collected, and these microorganisms and eggs of small and large organisms are carried to foreign countries with the movement of the ship. This worsens the destruction of the ecological system, such as the replacement of the existing species in a sea area with the species which do not originally live in that area. Against this background, the diplomatic conference of the International Maritime Organization (IMO) has adopted the obligation to undergo a periodic inspection on a ballast water treatment apparatus etc., and this applies to a ship built after 2009. Moreover, according to the Convention for the Control and Management of Ships' Ballast Water and Sediments, the ballast water discharge standard will be defined as shown in the following Table 1. Therefore, it is necessary to reduce the number of microorganisms in the ballast water to about 1/100 of that existing in the open ocean at the time of discharge of the ballast water.

TABLE 1

| Item | Ballast water quality standard | Size |
| --- | --- | --- |
| Plankton | 10 pieces/ml | 10 to 50 μm |
| Plankton | 10 pieces/m³ | 50 μm or more |
| Escherichia coli | 250 cfu/100 ml | 0.5 to 3 μm |
| Vibrio cholerae | 1 cfu/100 ml | 0.5 to 3 μm |
| Enterococcus | 100 cfu/100 ml | 0.5 to 3 μm |

In the present invention, when an MF membrane having a nominal pore diameter of 0.4 μm is used, and the filter cloth 12 with a pore diameter distribution in the range of 0.1 to 50 μm and with a peak of the pore diameter distribution at 20 μm is used, it is possible to remove 100% of the plankton having a size of 50 μm or larger and remove almost all of the plankton having a size of 10 to 50 μm with the filter cloth 12. This helps reduce the fouling adhered to the filtration membrane 10, prolong the time that elapses before the filtration membrane 10 reaches a capture limit, and thereby prolong the filtration time. The filtration membrane 10 can completely remove the plankton of a size of 10 to 50 μm, and remove 100% of the bacteria.

Figure 2:
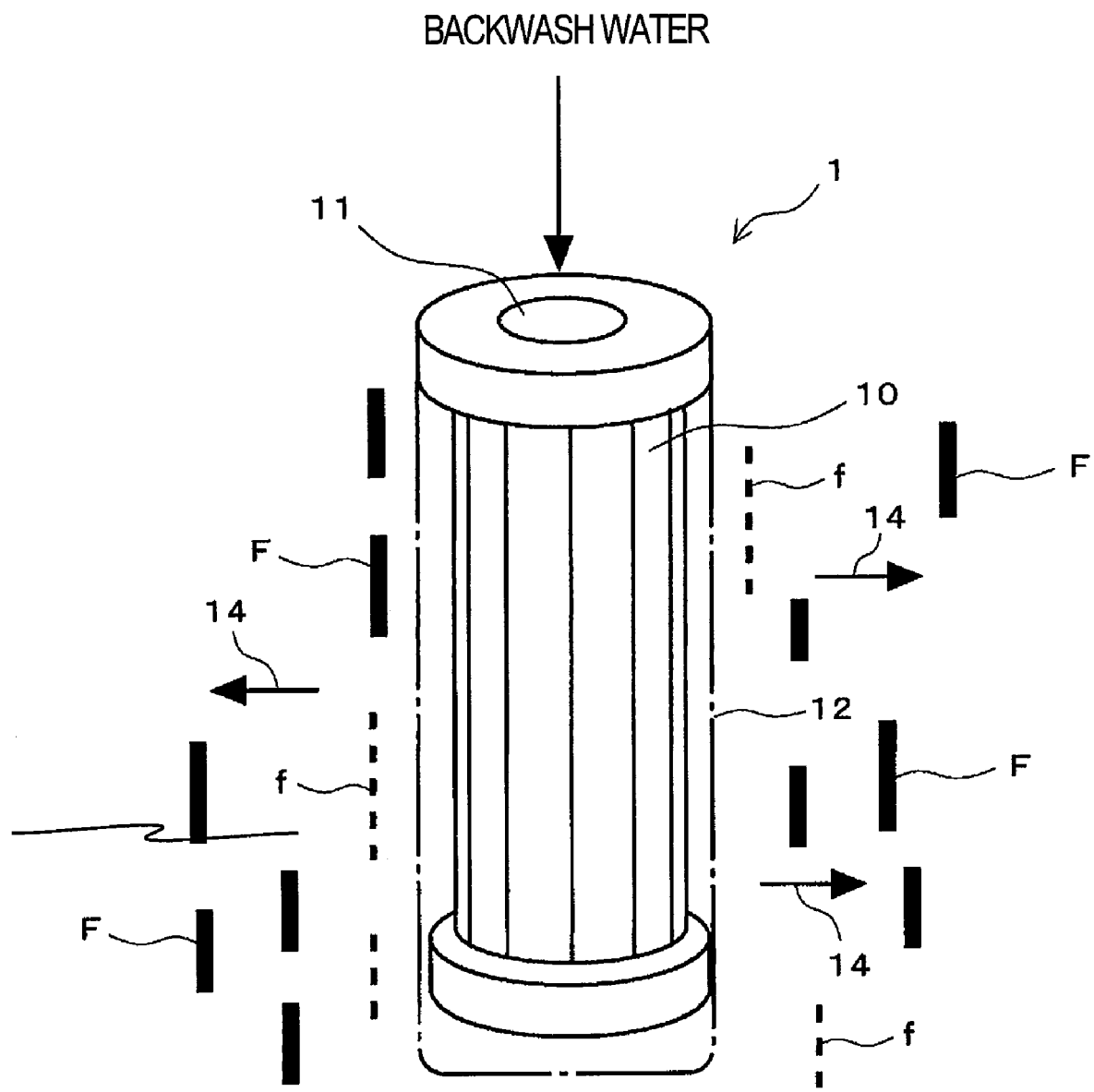
FIG. 2 is a diagram showing a state of FIG. 1 at the time of backwash.

One feature of the membrane treatment apparatus 1 of the present invention is the structure in which the filtration membrane 10 and the filter cloth 12 of the membrane treatment apparatus 1 can be backwashed at the same time. Such a backwash will be explained. As shown in FIG. 2, wash water (backwash water) is injected from the treatment water output 11. The injected backwash water flows from the inside of the filtration membrane 10 toward the outside thereof, thereby discharging the fouling F and f captured by the filtration membrane 10 to the outside. Since the fouling F and f thus discharged has originally passed through the filter cloth 12, it is discharged to the outside by passing through the filter cloth 12 by a reverse direction flow. Moreover, the fouling F and f captured by the filter cloth 12 is also discharged to the outside by the backwash water as indicated by an arrow 14.

In the present invention, when the filter cloth 12 has stretching properties, it is possible to remove the fouling F and f captured by the filter cloth 12 easily.

In the present invention, unlike the conventional example, there is no need to wash the filter cloth 12 separately, and it is possible to wash the filter cloth 12 with the filtration membrane 10 by the backwash water. This helps simplify a washing process. Furthermore, since there is no need for an apparatus for moving the filter cloth 12, and all that is needed is to provide a stocking-type filter cloth 12, the cost of the membrane treatment apparatus 1 is reduced.

Second Embodiment

Next, another embodiment of the present invention will be explained. This embodiment deals with an example in which the filter cloth 12 is provided in such a way as to cover the outer circumferential side of the filtration membrane 10 with the bottom of the filtration membrane 10 uncovered, the example adopting a so-called skirt-type filter cloth.

Figure 5:
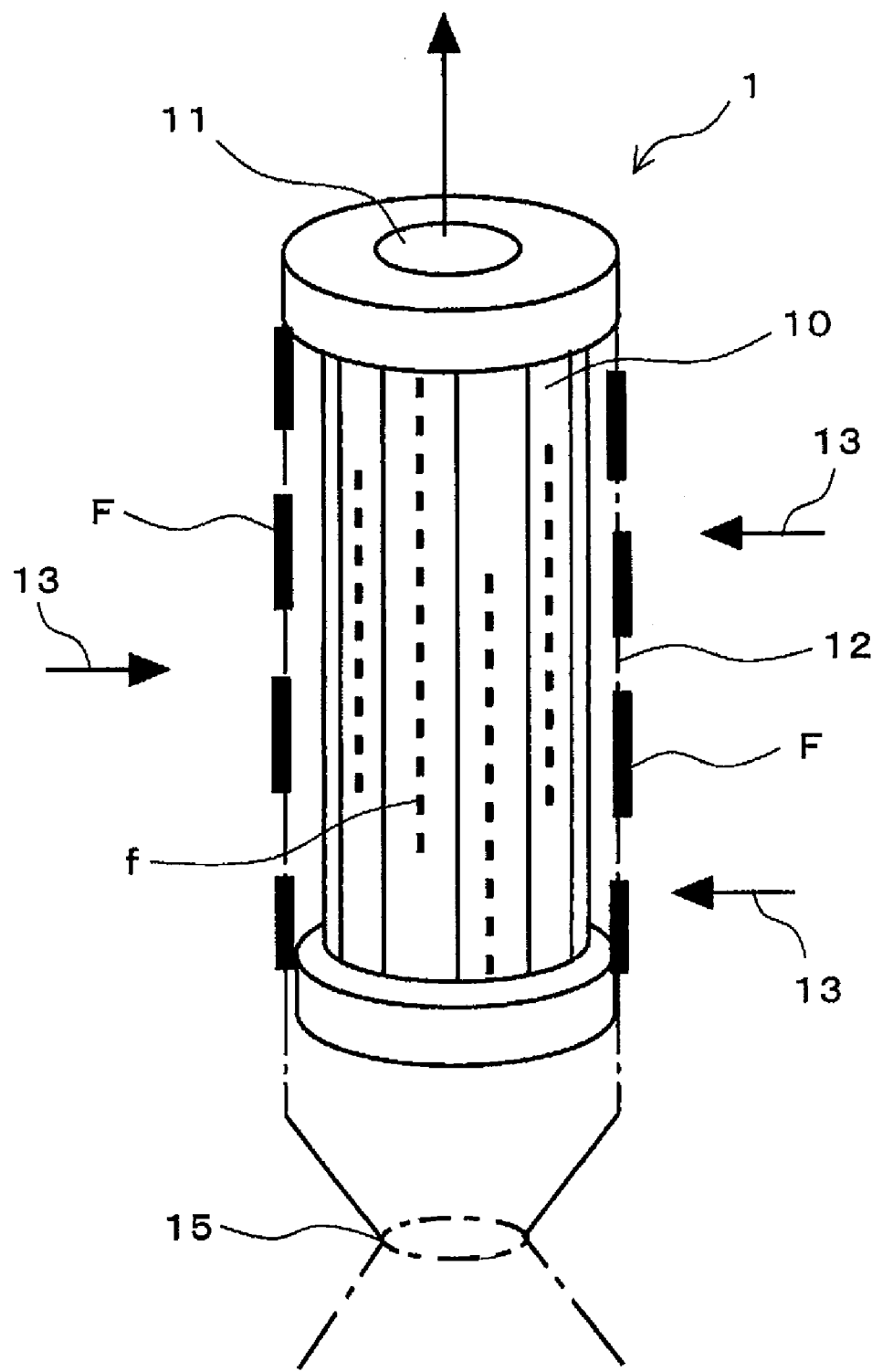
FIG. 5 is a diagram showing another example of the membrane treatment apparatus of the present invention.

FIG. 5 is a diagram showing the second embodiment. As shown in this drawing, the filter cloth 12 is of the skirt type and has an opening in a lower part thereof. It is also preferable to narrow the lower part of the filter cloth 12 with an elastic cord body 15 such as a rubber band to prevent the filter cloth 12 from turning outward at the time of filtration.

Figure 6:
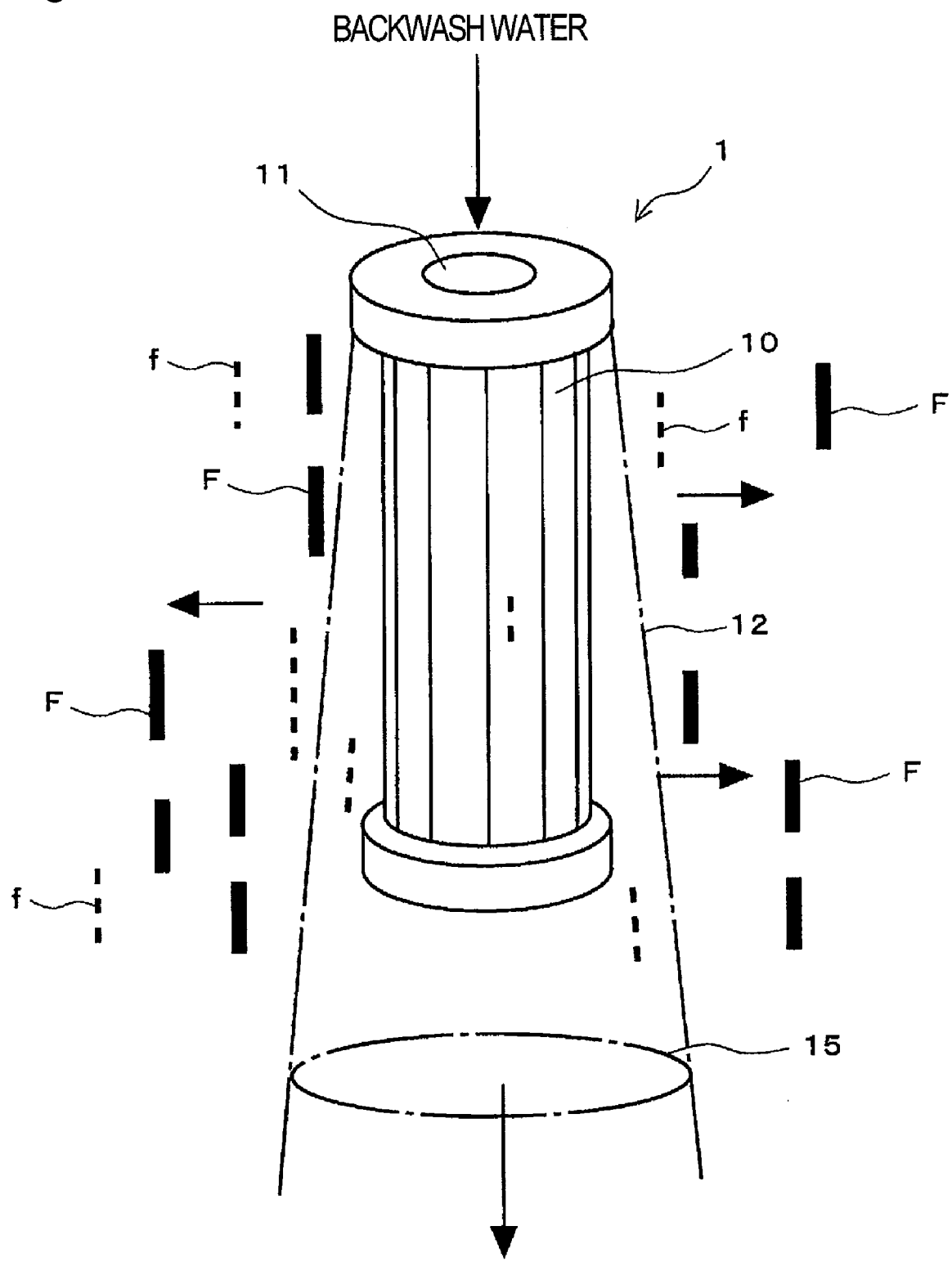
FIG. 6 is a diagram showing a state of FIG. 5 at the time of backwash.

In other words, the lower part of the filter cloth 12 is made to project downward so that it is located below the lower end of the filtration membrane 10, and the outer circumference of the projecting portion is narrowed with the elastic cord body 15. By doing so, it is possible to prevent the fouling F and f of the filtration membrane 10 from accumulating between the filter cloth 12 and the filtration membrane 10 at the time of backwash. That is, as shown in FIG. 6, at the time of backwash, the elastic cord body 15 stretches by backwash water pressure, whereby the fouling F and f of the filtration membrane 10 falls off.

In this embodiment, the filter cloth 12 is allowed to move with flexibility, which produces the effect of making the fouling F and f fall off as a result of the filter cloth 12 swinging at the time of backwash.

EXAMPLE

Hereinafter, the effect of the present invention will be demonstrated by examples.

Example 1

Filtration treatment for raw water and a backwash process were performed by using the membrane treatment apparatus shown in FIG. 1.
<Raw Water Condition>
Raw water: seawater from which ballast water is taken
Raw water nature:
SS: 5.0 mg/l
Plankton:
10 to 50 μm: 10/ml
50 μm or larger: $5\times10^4/m^3$
Bacteria: $5\times10^4$ cfu/100 ml
<Specifications of a Membrane Treatment Apparatus>
Filtration membrane: microfiltration membrane (nominal pore diameter 0.4 μm)
Pressure applied: 20 to 500 kPa <Specifications of a Filter Cloth>
Installation yype of a filter cloth: stocking type
Material of a filter cloth: nonwoven cloth
Pore diameter distribution of a filter cloth:
Pore diameter distribution: 0.1- to 50-μm range
Peak of pore diameter distribution: about 20 μm
<Treatment Result>
Result of Treatment with a Filter Cloth
(1) 100% of the plankton having a size of 50 μm or larger could be removed.
(2) Almost all of the plankton having a size of 10 to 50 μm could be removed.
Result of Treatment with a Filtration Membrane
(1) The plankton having a size of 10 to 50 μm could be completely removed.
(2) 100% of the bacteria could be removed.
<Backwash Process>
When no filter cloth was provided, the time that elapsed before the filtration membrane reached a capture limit was 8 minutes; when a filter cloth was provided, the time that elapsed before the filtration membrane reached a capture limit was 20 minutes. Thus, it was apparent that the time was prolonged, whereby the filtration time was prolonged accordingly.

Example 2

Filtration treatment for raw water and a backwash process were performed in the same manner as in Example 1 except that the membrane treatment apparatus was replaced with a membrane treatment apparatus (installation type of a filter cloth: skirt type) shown in FIG. 5. The obtained treatment result was the same as that of Example 1.
<Backwash Process>
When a filter cloth was provided, the time that elapsed before the filtration membrane reached a capture limit was 30 minutes. Thus, it was apparent that the time was further prolonged as compared to Example 1, whereby the filtration time was prolonged accordingly.

The invention claimed is:
1. A membrane treatment apparatus comprising:
a filtration membrane filtering raw water existing in an external environment by applying pressure thereto; and
a treated water outlet from which treated water collected after filtration by the filtration membrane is taken,
wherein the membrane treatment apparatus is provided with a filter cloth provided outside the filtration membrane with a predetermined space left between the filter cloth and the filtration membrane;
wherein the filter cloth covers an outer circumferential side of the filtration membrane with a bottom of the filtration membrane uncovered, and wherein a lower part of the filter cloth is made to project downward so that the lower part is located below a lower end of the filtration membrane, and an outer circumference of the projecting portion is narrowed with an elastic cord body.
2. The membrane treatment apparatus according to claim 1, wherein the filter cloth has a pore diameter distribution in a range of 0.1 to 50 μm, and has a peak of the pore diameter distribution in a range of 5 to 25 μm.
3. The membrane treatment apparatus according to claim 1, wherein the filtration membrane is a microfiltration membrane, and a nominal pore diameter thereof is in the range of 0.1 to 1.0 μm.
4. The membrane treatment apparatus according to claim 1, wherein the filter cloth is pleated.

* * * * *